US011009169B2

(12) United States Patent
Kobayashi et al.

(10) Patent No.: US 11,009,169 B2
(45) Date of Patent: May 18, 2021

(54) PIPE, DIE, AND METHOD FOR MANUFACTURING PIPE

(71) Applicant: SANOH INDUSTRIAL CO., LTD., Tokyo (JP)

(72) Inventors: Norio Kobayashi, Koga (JP); Kazuhiko Nakazato, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 344 days.

(21) Appl. No.: 15/543,913

(22) PCT Filed: Nov. 11, 2015

(86) PCT No.: PCT/JP2015/081714
§ 371 (c)(1),
(2) Date: Jul. 14, 2017

(87) PCT Pub. No.: WO2016/113992
PCT Pub. Date: Jul. 21, 2016

(65) Prior Publication Data
US 2017/0370515 A1 Dec. 28, 2017

(30) Foreign Application Priority Data
Jan. 15, 2015 (JP) .............................. JP2015-006137

(51) Int. Cl.
*F16L 43/00* (2006.01)
*F16L 9/00* (2006.01)
*B21D 7/025* (2006.01)

(52) U.S. Cl.
CPC ............ *F16L 43/005* (2013.01); *B21D 7/025* (2013.01); *F16L 9/006* (2013.01)

(58) Field of Classification Search
CPC . F16L 9/02; F16L 9/006; F16L 43/001; F16L 43/005
USPC .............................. 138/177, DIG. 8, DIG. 11
See application file for complete search history.

(56) References Cited

U.S. PATENT DOCUMENTS

| 417,992 A | * | 12/1889 | Dell |
| 2,406,838 A | | 9/1946 | Kepler |
| 2,583,401 A | * | 1/1952 | Weltmer ............... F16L 43/001 |
| 3,603,131 A | | 9/1971 | Gregg et al. |
| 4,729,409 A | * | 3/1988 | Paul |

(Continued)

FOREIGN PATENT DOCUMENTS

| CN | 1122266 A | 5/1996 |
| CN | 201342443 Y | 11/2009 |

(Continued)

OTHER PUBLICATIONS

International Preliminary Report on Patentability For PCT App No. PCT/JP2015/081714 dated Jul. 27, 2017, 9 pgs.

(Continued)

*Primary Examiner* — Zachary T Dragicevich
(74) *Attorney, Agent, or Firm* — Procopio, Cory, Hargreaves & Savitch LLP (57) ABSTRACT

A metal pipe including a curved portion produced by bending in which a plurality of non-bending surfaces and a plurality of bent portions at which the non-bending surfaces are connected in a bending manner are provided on a circumferential surface on an inside of a center of a curvature side of the curved portion is provided.

4 Claims, 9 Drawing Sheets

(56) References Cited

U.S. PATENT DOCUMENTS

| | | | |
|---|---|---|---|
| 5,142,895 A | | 9/1992 | Schuchert |
| 5,495,873 A | * | 3/1996 | Butkiewicz .................. 138/177 |
| 2005/0145287 A1 | * | 7/2005 | Ottolini ..................... 138/177 X |
| 2012/0132310 A1 | * | 5/2012 | Cavaliere ................ F16L 9/006 |

FOREIGN PATENT DOCUMENTS

| | | |
|---|---|---|
| CN | 202725798 U | 2/2013 |
| CN | 104550369 A | 4/2015 |
| JP | S52-071368 A | 6/1977 |
| JP | S58-185324 U | 12/1983 |
| JP | H1-122622 A | 5/1989 |
| JP | H06-246359 A | 9/1994 |
| JP | 2001-047141 A | 2/2001 |
| JP | 2002-301520 A | 10/2002 |
| JP | 2004-009125 A | 1/2004 |
| JP | 2004-074221 A | 3/2004 |
| JP | 2012-135797 A | 7/2012 |
| JP | 2013-248945 A | 12/2013 |

OTHER PUBLICATIONS

Office Action for related Japanese Patent Application No. 2015-006137, dated Sep. 11, 2018.
Office Action for Related Chinese Patent Application No. 201580059521.7 dated May 3, 2018; 8 pages.
International Search Report and Written Opinion for PCT App No. PCT/JP2015/081714 dated Dec. 28, 2015, 8 pgs.

* cited by examiner

PIPE, DIE, AND METHOD FOR MANUFACTURING PIPE

The present application is a National Stage entry of PCT/JP2015/081714, filed on Nov. 11, 2015, and claims priority to Japanese Patent Application No. 2015-006137, filed on Jan. 15, 2015, the contents of which are incorporated by reference in their entirety.

TECHNICAL FIELD

The present invention relates to a pipe with a curved portion formed by bending processing, a die used to form the curved portion, and a method for manufacturing the pipe.

BACKGROUND ART

When a metal pipe is bent to form a curved portion, wrinkles are produced on an inside circumferential surface on the curvature center side of the metal pipe. As a method for reducing the wrinkles, for example, a method is known in which a wiper is interposed between the die and the pipe, and the curved portion is formed while being pressed by the wiper so that the wrinkles are smoothed (refer to Patent Literature 1 and Patent Literature 2).

However, use of the wiper cannot be said to be efficient because the wiper is a consumable item and also is costly. In addition, the wiper is a member interposed inside the bend, and hence has been unsuitable for forming a pipe with a curved portion having a small radius of curvature.

Alternatively, a method is known in which, instead of irregular wrinkles having an adverse appearance, regular undulation are formed to give a good appearance, and as a result, the wiper can be taken out of use (refer to Patent Literature 3, Patent Literature 4, and Patent Literature 5).

CITATION LIST

Patent Literature

Patent Literature 1: Japanese Unexamined Patent Publication No. H6-246359
Patent Literature 2: Japanese Unexamined Patent Publication No. 2004-9125
Patent Literature 3: Japanese Unexamined Patent Publication No. 2012-135797
Patent Literature 4: Japanese Unexamined Patent Publication No. 2002-301520
Patent Literature 5: U.S. Pat. No. 5,142,895

SUMMARY OF INVENTION

Technical Problems

However, even the pipe with the intentionally formed regular undulations inside the bend thereof has inevitably an adverse appearance due to the undulations. In addition, wrinkle-like undulations are also formed on an inner surface side of the pipe where a fluid flows, and stagnation and resistance of the flow may be likely to occur to be a cause of corrosion.

The present invention is intended to solve the problems described above, and aims to provide a pipe that maintains a good appearance and reduces the stagnation and the resistance of the flow on the inner surface side of the pipe where the fluid flows, a die used to manufacture the pipe, and a method for manufacturing the pipe.

Solution to Problems

According to the present invention, a metal pipe including a curved portion produced by bending is characterized in that a plurality of non-bending surfaces and a plurality of bent portions at which the non-bending surfaces are connected in a bending manner are provided on a circumferential surface on an inside being a curvature center side of the curved portion.

In the case of a general pipe including a curved portion produced by bending, the inside, that is, a curvature center side thereof is compressed and is likely to generate wrinkles. The pipe described above is, however, bent so as to absorb the wrinkles with the bent portions, and consequently, not easily generates the wrinkles that impair appearance. Moreover, bending the pipe at the bent portions forms the non-bending surfaces without wrinkle-like undulations between the bent portions. As a result, stagnation and resistance of a flow of a fluid can be reduced on the inner surface side of the pipe where the fluid flows.

The wall thickness at the non-bending surfaces is preferably larger than the wall thickness at the bent portions. The surplus wall thickness generated on the inside, that is, the curvature center side of the curved portion is absorbed by the wall thickness at the non-bending surfaces. Consequently, the wrinkle-like udulations can be prevented from occurring in a more reliable manner.

If intersections between a virtual plane on a pipe axis line and the bent portions are defined, straight lines interconnecting the adjacent intersections can serve as a part of a polygon in the plane.

Furthermore, the bent portions are preferably constituted by a pair of sub-bent portions provided at both ends thereof in a direction along the pipe axis line and a plurality of main bent portions provided between the pair of sub-bent portions, and, if intersections between the plane and the main bent portions are specified as reference intersections, straight lines interconnecting the adjacent reference intersections preferably serve as a part of a regular polygon having the reference intersections as apices thereof and the curvature center as a center thereof. Since the straight lines serve as a part of the regular polygon, the bent portions are formed at even intervals, so that a good appearance is obtained at the finished stage, and the design is improved.

Furthermore, the number of corners of the regular polygon is preferably six or larger so that the intervals between the bent portions are not narrowed, and the wrinkle-like undulations and the wrinkles can be prevented from occurring in a more reliable manner.

The pipe described above preferably further includes a straight portion continuously connected to the curved portion, and the number of corners of the regular polygon described above is preferably a natural number equal to or smaller than a value (x) derived by Expression (1) below, where (d) denotes the outside diameter of the straight portion, (r) denotes the radius of curvature of the curved portion, and (t) denotes the wall thickness of the straight portion. By doing so, the bent portions are formed in a more reliable manner.

[Math. 1]

$$x = 180/\sin^{-1}(t/(2r-d)) \quad (1)$$

According to the present invention, a metal pipe including a curved portion formed by curving an unprocessed pipe along a die for bending processing is characterized in that the unprocessed pipe is curved while being bent at circular arc-shaped apices provided in the die so that a plurality of bent portions corresponding to the apices and a plurality of non-bending surfaces connected in a bending manner at the bent portions are formed on a circumferential surface on an inside, that is, a curvature center side of the curved portion.

The pipe described above is bent so as to absorb the wrinkles with the bent portions, and consequently, not easily generates the wrinkles that impair the appearance. In addition, since the pipe is bent at the bent portions, the non-bending surfaces without the wrinkle-like undulations are formed between the bent portions. As a result, the stagnation and the resistance of the flow of the fluid can be reduced on the inner surface side of the pipe where the fluid flows.

According to the present invention, a die used to apply bending processing to an unprocessed pipe to form a metal pipe including a curved portion is characterized by including a die groove configured to guide the bending of the unprocessed pipe, and characterized in that the die groove includes a plurality of circular arc-shaped apices configured to abut on the unprocessed pipe to form a plurality of bent portions when the bending processing is performed.

Use of this die facilitates manufacturing of the pipe having the curved portion free of the wrinkles or the wrinkle-like undulations that impair the appearance at portions other than the bent portions, and can reduce the stagnation and the resistance of the flow of the fluid on the inner surface side of the pipe where the fluid flows. The use of this die facilitates forming of the pipe without wrinkles without using a wiper. As a result, the pipe having the curved portion with a small radius of curvature can easily be manufactured.

Furthermore, the die groove of this die preferably includes non-bending surface receiving portions configured to abut on the unprocessed pipe between the apices to form non-bending surfaces. The inclusion of the non-bending surface receiving portions can form the non-bending surfaces without wrinkles in a more reliable manner.

According to the present invention, a pipe manufacturing method for manufacturing a metal pipe including a curved portion formed by curving an unprocessed pipe along a die for bending processing is characterized by the step of curving while bending the unprocessed pipe at circular arc-shaped apices provided in the die so as to form a plurality of bent portions corresponding to the apices and a plurality of non-bending surfaces connected in a bending manner at the bent portions on a circumferential surface on an inside, that is, a curvature center side of the curved portion.

With this pipe manufacturing method, the wrinkles can be absorbed by the bent portions that are substantially intended to be formed, and in addition, the curved portion without the wrinkle-like undulations can be formed. As a result, the pipe can be manufactured that has a good appearance, and that can reduce the stagnation and the resistance of the flow on the inner surface side of the pipe where the fluid flows. With this pipe manufacturing method, the pipe without wrinkles can easily be formed without using a wiper. As a result, the pipe having the curved portion with a small radius of curvature can easily be manufactured.

In this pipe manufacturing method, the pipe is preferably formed so as to have a wall thickness at the non-bending surfaces larger than the wall thickness at the bent portions so that the wrinkle-like undulations can be prevented from occurring in a more reliable manner.

In this pipe manufacturing method, if intersections between a virtual plane on a pipe axis line and the bent portions are defined, the pipe can be formed so that straight lines interconnecting the adjacent intersections serve as a part of a polygon in the plane.

Furthermore, in this pipe manufacturing method, if one of the straight lines continuing in a bending manner in the virtual plane mentioned above other than two straight lines serving as both ends of the straight lines is specified as a reference straight line, and intersections at both ends of the reference straight line is specified as a pair of reference intersections, the pipe is preferably formed so that the polygon mentioned above is a regular polygon in which an included angle formed by two reference straight lines passing through the curvature center and the pair of reference intersections serves as a central angle. The straight lines serve as a part of the regular polygon, so that the bent portions are formed at even intervals, and the pipe with improved design can be manufactured.

Furthermore, in this pipe manufacturing method, by being formed so that the number of corners of the regular polygon is six or larger, the pipe can be manufactured such that the intervals between the bent portions are not narrowed, and the wrinkle-like undulations and the wrinkles are reduced in a more reliable manner.

Furthermore, in this pipe manufacturing method, the pipe is preferably formed so that the number of corners of the regular polygon is six or larger, and is a natural number equal to or smaller than a value (x) derived by Expression (1) below, where (d) denotes an outside diameter of the unprocessed pipe, (r) denotes a radius of curvature of the curved portion, and (t) denotes a wall thickness of the unprocessed pipe. By doing so, the bent portions are formed in a more reliable manner.

[Math. 2]

$$x = 180/\sin^{-1}(t/(2r-d)) \qquad (1)$$

Advantageous Effects of Invention

The present invention can provide a pipe that can maintain a good appearance and can reduce stagnation and resistance of a flow of a fluid on the inner surface side of the pipe where the fluid flows.

BRIEF DESCRIPTION OF DRAWINGS

FIG. 3(a) is a perspective view illustrating a starting state of the bending processing, and FIG. 3(b) is a perspective view illustrating an ending state of the bending processing.

FIG. 9(a) is a plan view according to a first modification, FIG. 9(b) is a plan view according to a second modification, FIG. 9(c) is a plan view according to a third modification, FIG. 9(d) is a plan view according to a fourth modification, FIG. 9(e) is a plan view according to a fifth modification, and FIG. 9(f) is a plan view according to a sixth modification.

DESCRIPTION OF EMBODIMENT

Hereinafter; an embodiment according to the present invention will be described with reference to the drawings. A pipe 1 according to the present embodiment (refer to FIGS. 6 and 7) is made of metal, and has a curved portion 2 formed by applying bending processing to a straight pipe (hereinafter, called an "unprocessed pipe") 100. Hereinafter, a pipe manufacturing method for manufacturing the U-shaped pipe 1 having the curved portion 2 will first be described.

As illustrated in FIGS. 1, 2, 3, and 4, the pipe 1 having the curved portion 2 is manufactured using, for example, a bending device 30. The bending device 30 includes a die unit (die) 40 that gives the unprocessed pipe 100 a shape to be the curved portion 2 and a bending unit 50 that applies a bending stress to the unprocessed pipe 100 with a rotational axis line Ar passing through the curvature center of the bending processing as a supporting point.

Figure 1:
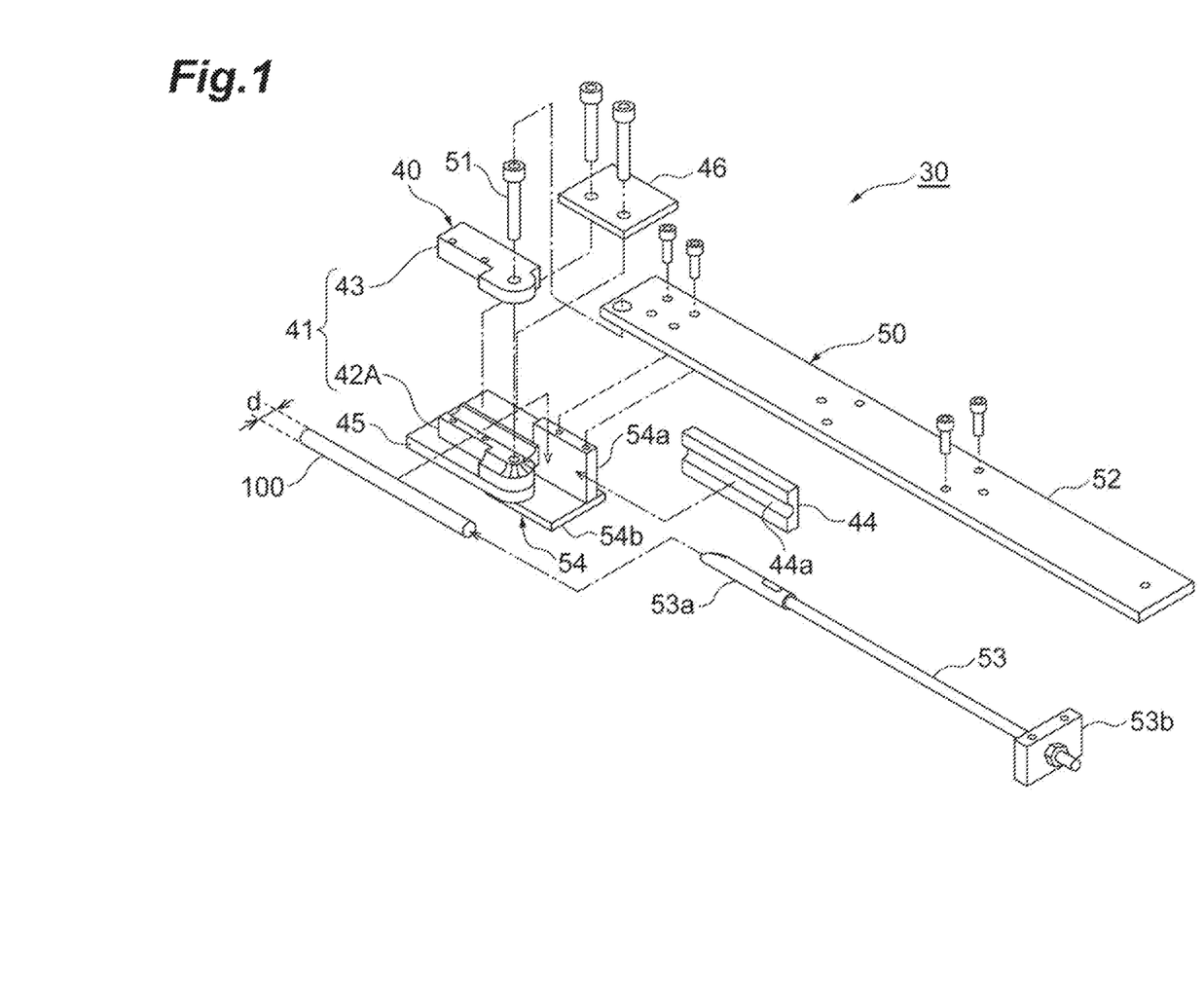
FIG. 1 is an exploded perspective view that illustrates a bending device used to manufacture a pipe according to an embodiment of the present invention, and illustrates a state at the time of preparation for mounting the pipe before bending processing is performed.
Figure 2:
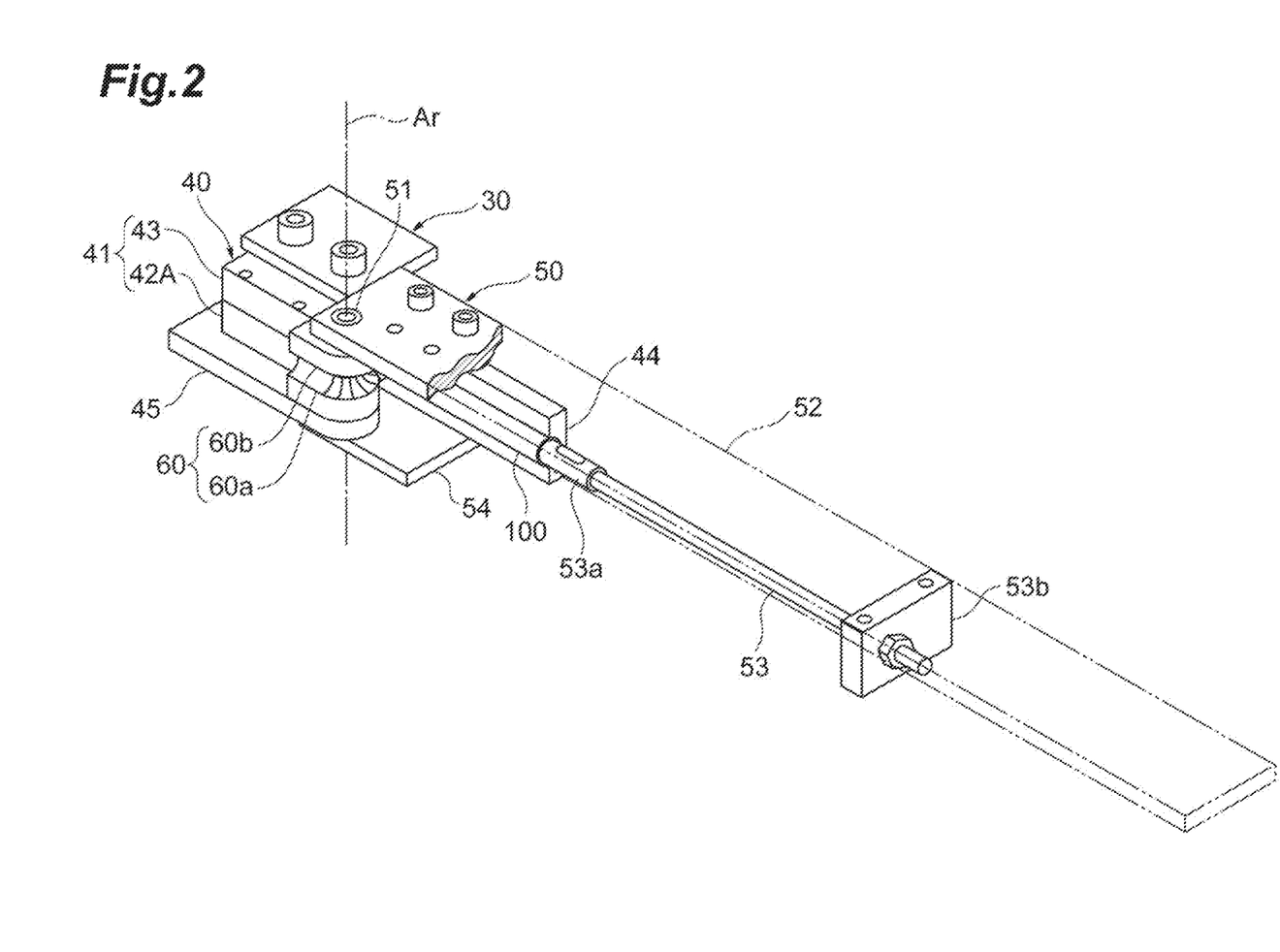
FIG. 2 is a view illustrating a state where a straight unprocessed pipe is mounted on the bending device, and is a perspective view illustrating a partially sectioned state.

The die unit 40 includes a roll die 41 that forms an outer circumferential surface (circumferential surface) 2a on the inside, that is, mainly a curvature center Px side of the outer circumferential surface of the curved portion 2, and also includes a pressure die 44 that presses the outer circumferential surface of the curved portion 2 from an outside circumferential surface 2b thereof to curve the pipe. The roll die 41 can be split up and down with the lower side being a split roll lower die 42A and the upper side being a split roll upper die 43. The split roll lower die 42A is fixed to a base plate 45, and the split roll upper die 43 is superimposed on the split roll lower die 42A. In addition, a pressing plate 46 abutting on an edge of the split roll upper die 43 is provided. The pressing plate 46 is bolted to support the roll die 41 between itself and the base plate 45. The pressure die 44 is a plate-like member, in which a longitudinal groove 44a having a semicircular cross section capable of accommodating a half section of the unprocessed pipe 100 is formed.

The bending unit 50 includes a pin unit 51 having the rotational axis line Ar passing through the curvature center Px of the bending processing; a bending arm 52 rotatably connected to the roll die 41 via the pin unit 51; a metal core 53 that is inserted in the unprocessed pipe 100 and prevents the inner surface of the pipe from crushing during the binding processing; and a pressure die holding unit 54 that rotationally moves in conjunction with the bending arm 52 while holding the pressure die 44.

The pin unit 51 is mounted so as to pass through the roll die 41 and the base plate 45 and reach the pressure die holding unit 54. The bending arm 52 is rotatably fitted at one end thereof on the head of the pin unit 51, and is mounted so as to be swingable using the pin unit 51 as a supporting point. The metal core 53 is inserted at a distal end 53a thereof in the unprocessed pipe 100, and is fixed at a proximal end 53b thereof to a lower surface of the bending arm 52. The pressure die holding unit 54 includes a pedestal unit 54b that supports the pressure die 44, and a platelike holding unit 54a that is provided in a standing manner on the pedestal unit 54b and holds the pressure die 44 between the plate-like holding unit 54a and the roll die 41 while keeping the pressure die 44 abutting on the unprocessed pipe 100. The holding unit 54a is fixed to the lower surface of the bending arm 52, and the pedestal unit 54b is rotatably connected to the base plate 45 via the pin unit 51 so as to be movable in conjunction with the bending arm 52.

As illustrated in FIG. 1, before the bending processing is performed, members of the bending device 30 are in a disassembled state. In this state, the unprocessed pipe 100 is set so as to be accommodated between the split roll lower die 42A and the split roll upper die 43, and furthermore, the bending arm 52 is mounted so as to be rotatable about the roll die 41 via the pin unit 51. The distal end 53a of the metal core 53 is inserted into the unprocessed pipe 100, and the proximal end 53b of the metal core 53 is fixed to the lower surface of the bending arm 52. The pressure die 44 is mounted so as to be in contact with the circumferential surface 2b of the unprocessed pipe 100, and furthermore, the pressure die holding unit 54 for holding the pressure die 44 is fixed to the lower surface of the bending arm 52. Thus, a preparation step of the bending processing ends (refer to FIG. 2).

Figure 3:
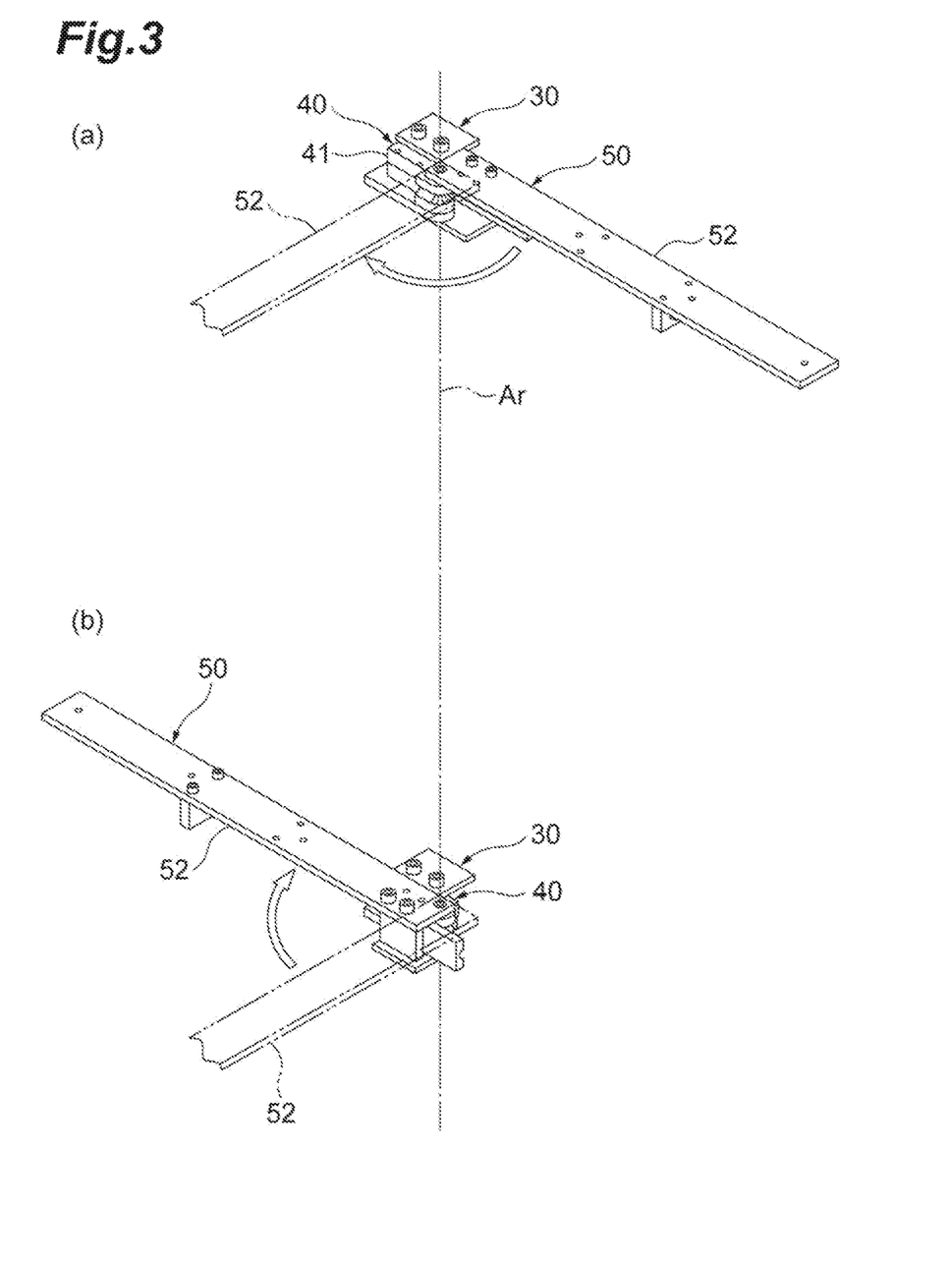
FIG. 3 depicts views illustrating states where the bending processing is applied to the unprocessed pipe mounted on the bending device, that is.
Figure 4:
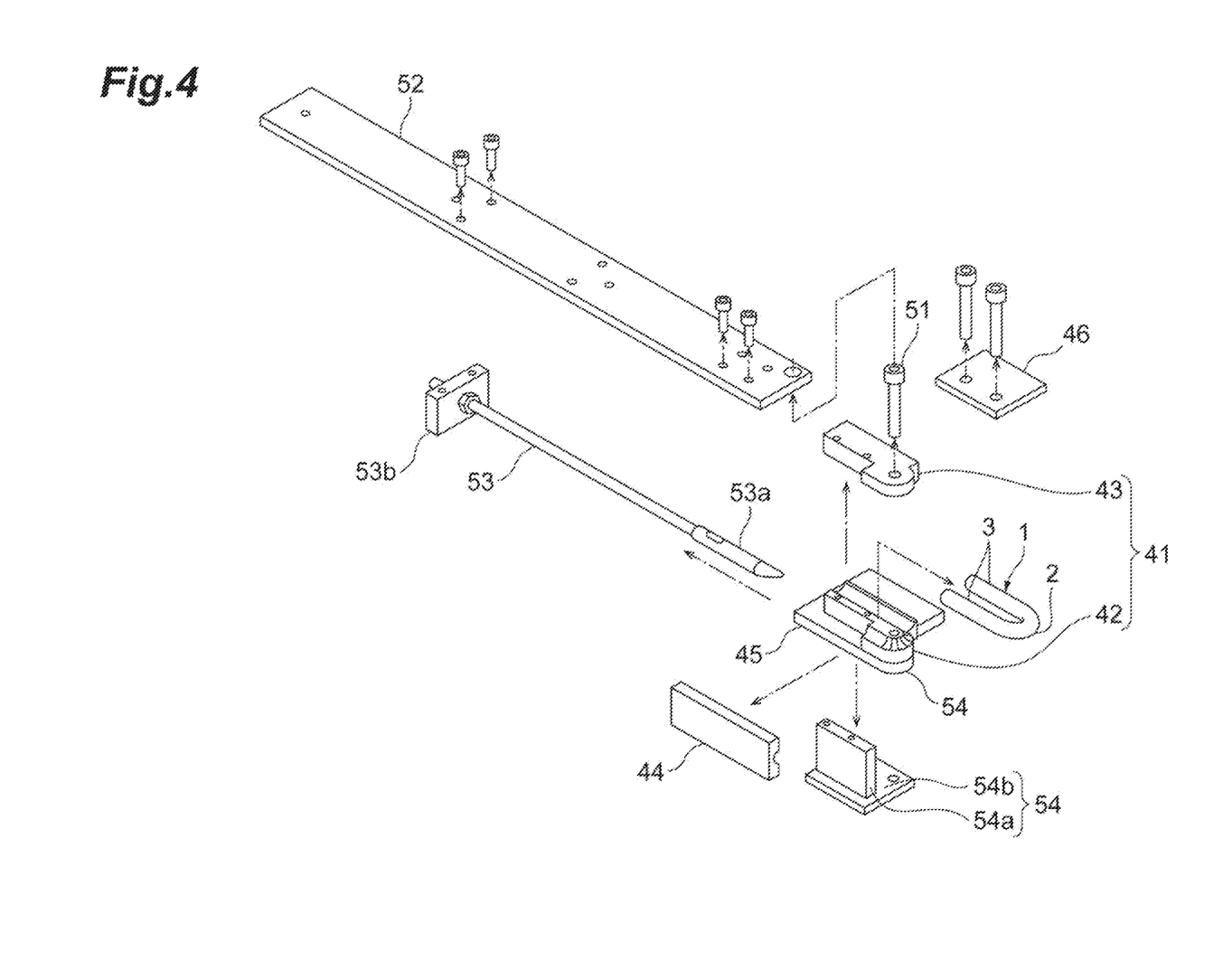
FIG. 4 is an exploded perspective view illustrating a state where the bending device is disassembled, and the pipe is removed from the bending device after the end of the bending processing.

Then, as illustrated in FIG. 3, the bending arm 52 is rotated around the rotational axis line Ar to curve the unprocessed pipe 100. As a result, the pipe 1 having the U-shaped curved portion 2 is formed. The rotational axis line Ar serves as the substantial curvature center Px of the curved portion 2 (refer to FIGS. 6 and 7). The present embodiment assumes that the unprocessed pipe 100 has an outside diameter (d) of 12 mm, a wall thickness (t) of 1 mm, and is made of a material of iron, and assumes that the distance from the pipe axis line of the curved portion 2 to the curvature center Px, that is, a radius of curvature (r) is 12 mm, and the bending angle is 180 degrees. However, another metal material can be used as the material of the unprocessed pipe 100 used, and the outside diameter (d), the radius of curvature (r), and the bending angle can be changed as appropriate.

In the present embodiment, a straight portion 5 (refer to FIG. 5) is left on each of the leading end side and the trailing end side of the curved portion 2, and the bending angle is 180, which means that the pair of straight portions 5 continuously connected to the curved portion 2 are substantially parallel to each other. In the state where the curved portion 2 has been completed to be formed (refer to FIG. 3(b)), an elastic strain remains in the curved portion 2, and a restoring action slightly acts. Accordingly, the straight portion 5 on the trailing end side is curved to a degree of exceeding a position to be parallel to the straight portion 5 on the leading end side and reaching slightly inside the position, and is adjusted so as to result to be slightly restored and to be substantially parallel to the straight portion 5 on the leading end side after the bending stress is released.

The following describes details of the roll die 41. The bending angle is assumed to be 180 degrees, and also, pipe expansion processing is assumed to be applied to an end. Accordingly, the roll die 41 according to the present embodiment is split into two halves for the necessity of removing the pipe 1 from the roll die 41. If, however, the pipe expansion processing is not applied to the end, the pipe 1 can be removed in a manner pulled from the roll die 41 in theory if the bending angle is equal to or smaller than 180 degrees. That is, the roll die 41 need not be splittable, and can be appropriately employed according to, for example, the bending angle. The present embodiment will, however, be described by way of an example of the splittable form.

Axial holes H (refer to FIG. 5) concentric to each other are formed in the split roll lower die 42A and the split roll upper die 43 of the roll die 41. The pin unit 51 is inserted and mounted in the axial holes H. Substantially U-shaped die grooves 60 for guiding the bending of the unprocessed pipe 100 are formed in the split roll lower die 42A and the split roll upper die 43 so as to form the circumferential surface 2a on the inside of the curved portion 2 in cooperation with each other. The outside of the die grooves 60, that is, a side thereof not interfering with the circumferential surface 2a of the curved portion 2, is open. A lower die groove 60a on the split roll lower die 42A side and an upper die groove on the split roll upper die 43 have basically symmetric shapes. Hence, the description will focus on the lower die groove 60a, and a detailed description of the upper die groove of the split roll upper die 43 will be omitted.

Figure 5:
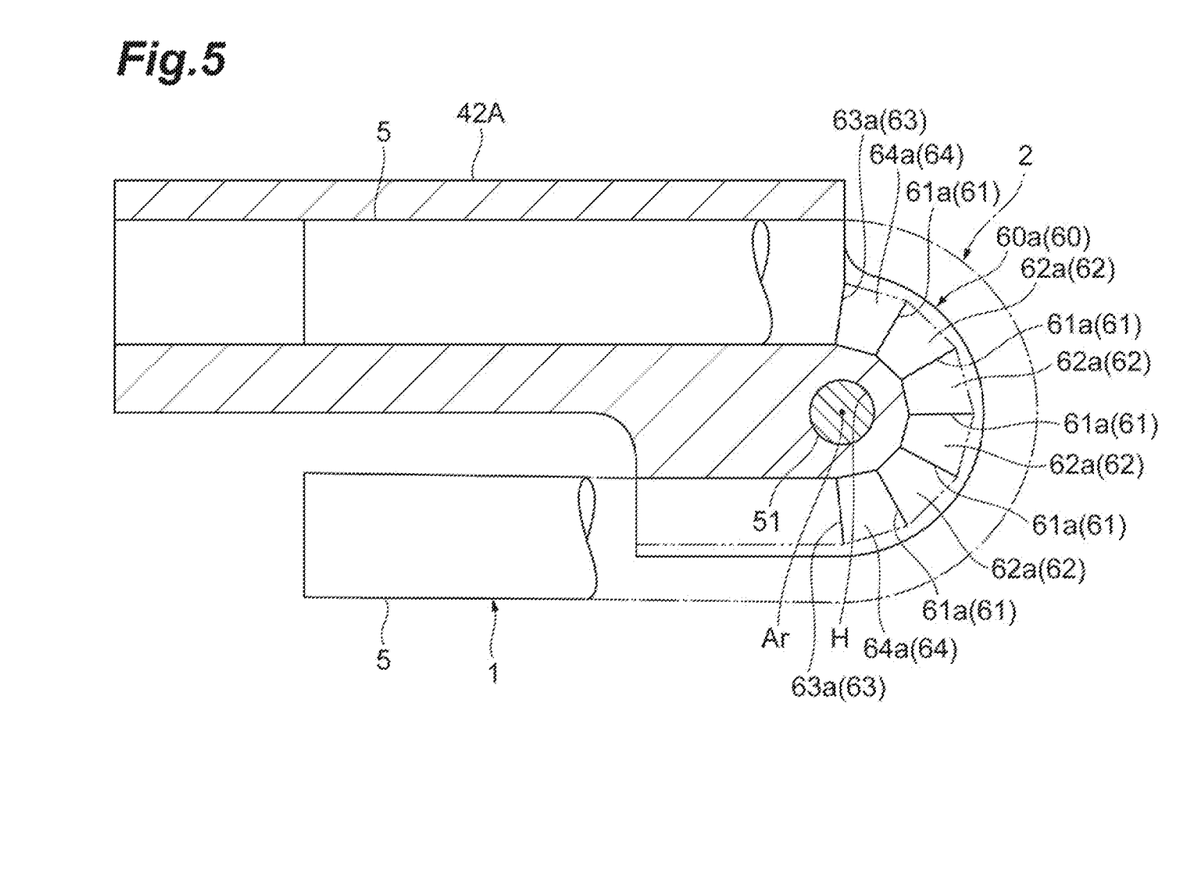
FIG. 5 is a plan view of a split roll lower die, in which portions other than a die groove and the pipe are indicated by hatching for convenience.

The lower die groove 60a is curved in a substantially U-shape. When viewed in a section, the lower die groove 60a has a concave curved surface shape having a circular arc shape produced by substantially quartering a circular shape to be a cross-section of the unprocessed pipe 100. In the following description, the direction of a U-shaped curve following the shape of the U-shaped lower die groove 60a will be described as the longitudinal direction of the lower die groove 60a.

In the lower die groove 60a, sub-pointed shape portions 63a are formed so as to project in pointed shapes at the start point and the end point of the bending processing, that is, at both ends in the longitudinal direction of the lower die groove 60a. A plurality of main pointed shape portions 61a arranged at even intervals are formed in a projecting manner between the pair of sub-pointed shape portions 63a. The sub-pointed shape portions 63a and the main pointed shape portions 61.a have each a circular arc shape. Planes including the sub-pointed shape portions 63a and planes including the main pointed shape portions 61a are each orthogonal to the longitudinal direction of the lower die groove 60a. In the present embodiment, the interval between a sub-pointed shape portion 63a and a main pointed shape portion 61a is larger than the interval between the main pointed shape portions 61a, but may be equal to the interval between the main pointed shape portions 61a.

In the same manner, in the upper die groove, sub-pointed shape portions on a circular arc are formed so as to continue to the sub-pointed shape portions 63a of the lower die groove 60a, and main pointed shape portions on a circular arc are formed so as to continue to the main pointed shape portions 61a.

The continuation of the main pointed shape portions 61a of the lower die groove 60a and the main pointed shape portions of the upper die groove forms main apices (apices) 61 that continue on the circular arc. The continuation of the sub-pointed shape portions 63a of the lower die groove 60a and the sub-pointed shape portions of the upper die groove forms sub-apices (apices) 63 that continue on the circular are. When the bending processing is applied to the unprocessed pipe 100, the main apices 61 and the sub-apices 63 abut on the circumferential surface 2a of the unprocessed pipe 100, and bend the circumferential surface 2a of the unprocessed pipe 100. As a result, a plurality of line-shaped bent portions 3A and 3B (refer to FIGS. 6 and 7) are formed on the circumferential surface 2a on the inside on the curvature center Px side of the unprocessed pipe 100.

The lower die groove 60a has main concave curved surfaces 62a provided between the main pointed shape portions 61a. The main concave curved surfaces 62a have shapes basically following the circumferential surface of the straight pipe. Concave curved surfaces are also formed in the upper die groove so as to continue to the main concave curved surfaces 62a of the lower die groove 60a. The continuation of the main concave curved surfaces 62a of the lower die groove 60a and the main concave curved surfaces of the upper die groove forms main receiving surfaces (non-bending surface receiving portions) 62 that abut on the unprocessed pipe 100 between the main apices 61, and form main non-bending surfaces 4A (refer to FIGS. 6 and 7). Sub-concave curved surfaces 64a are formed between the sub-pointed shape portions 63a and the main pointed shape portions 61a. The sub-concave curved surfaces 64a also have shapes basically following the circumferential surface of the straight pipe. Sub-concave curved surfaces are also formed in the upper die groove so as to continue to the sub-concave curved surfaces su-concave curved surfaces 64a. The continuation of the sub-concave curved surfaces 64a of the lower die groove 60a and the sub-concave curved surfaces of the upper die groove forms sub-receiving surfaces (non-bending surface receiving portions) 64 that abut on the unprocessed pipe 100 between the sub-apices 63 and the main apices 61, and form sub non-bending surfaces 4B.

To summarize the above, in the method for manufacturing the pipe according to the present embodiment, the metal pipe 1 having the curved portion 2 formed therein is formed by curving the unprocessed pipe 100 along the die unit 40 for the bending processing. Furthermore, the unprocessed pipe 100 is curved while being bent at the main apices 61 and the sub-apices 63 having the circular arc shape provided in the die unit 40, and thereby, the bent portions 3A and 3B corresponding to the main apices 61 and the sub-apices 63, and the main non-bending surfaces 4A and the sub non-bending surfaces 4B connected in a bending manner at the bent portions 3A and 3B are formed on the circumferential surface 2a on the inside, that is, the curvature center Px side of the curved portion 2 of the pipe 1.

Figure 6:
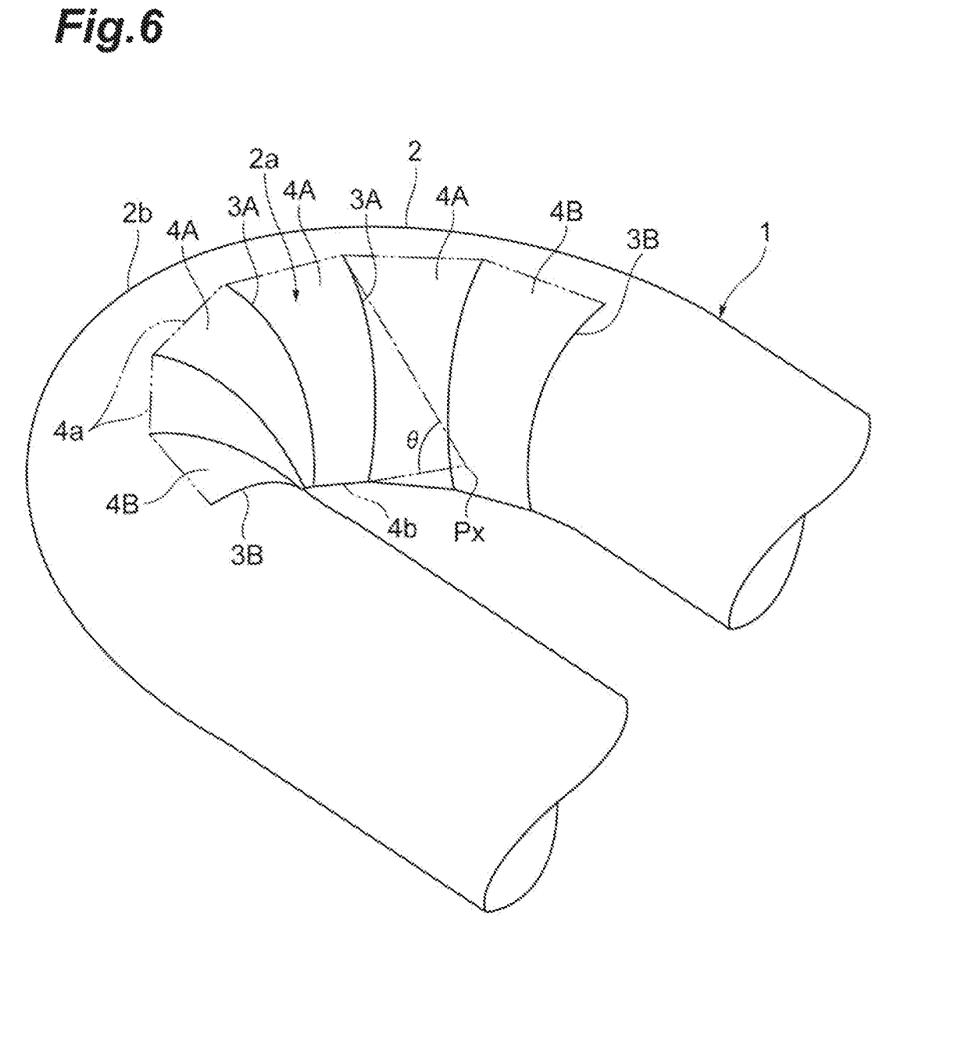
FIG. 6 is a perspective view illustrating a curved portion of the pipe in an enlarging manner.
Figure 7:
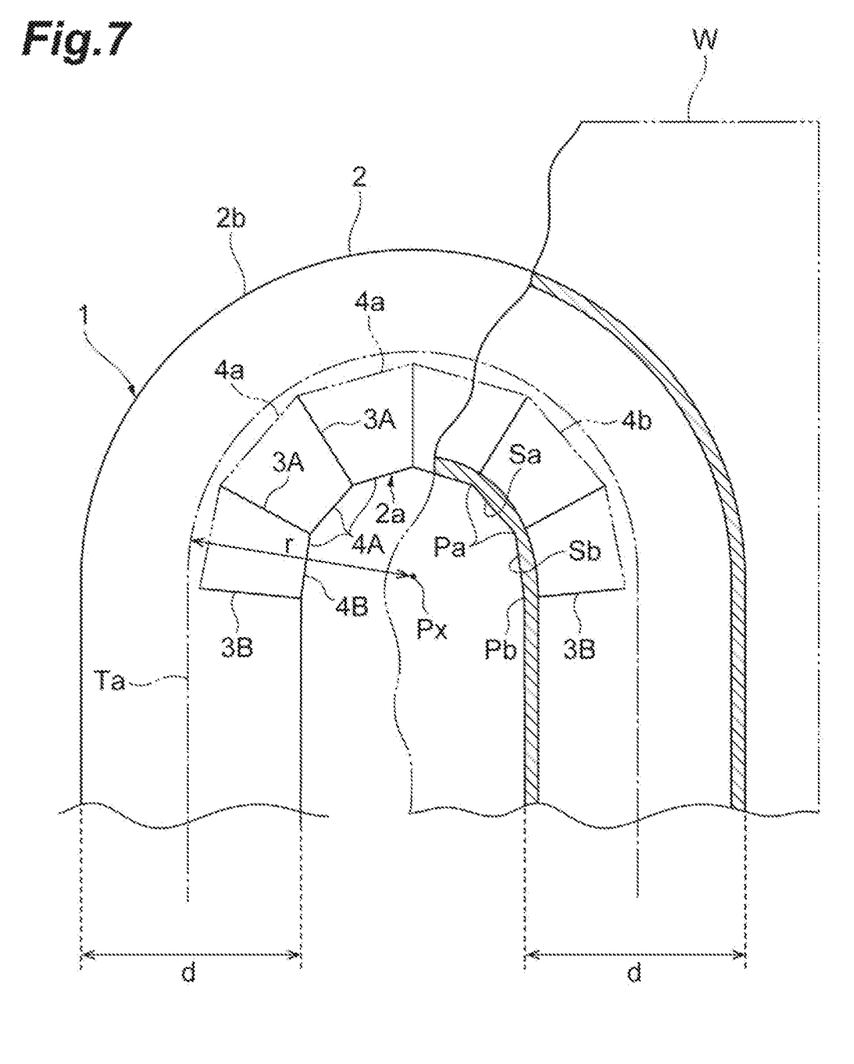
FIG. 7 is a plan view illustrating a part of the curved portion of the pipe partially sectioned along a reference plane.

The pipe 1 will be described more in detail (refer to FIGS. 6, 7, and 8). The pipe 1 has the U-shaped curved portion 2, and the bent portions 3A and 3B are provided on the circumferential surface 2a on the inside, that is, the curvature center Px side of the curved portion 2. Of the bent portions 3A and 3B, a pair of bent portions provided at the start point and the end point of the curved portion 2, that is, at both ends in a direction along a pipe axis line Ta are sub-bent portions 3B, and a plurality of bent portions provided between the pair of sub-bent portions 3B are main bent portions 3A.

The main non-bending surfaces 4A and the sub non-bending surfaces 4B connected in a bending manner at the main bent portions 3A and the sub-bent portions 3B are formed on the circumferential surface 2a. More in detail, the sub non-bending surfaces 4B are provided between the sub-bent portions 3B provided at the start point and the end point of the curved portion 2 and the main bent portions 3A, and the main non-bending surfaces 4A are provided between the main bent portions 3A. In the present embodiment, the main non-bending surfaces 4A and the sub non-bending surfaces 4B are examples of non-bending surfaces.

First, a virtual plane (hereinafter, called a reference plane) W on the pipe axis line Ta of the curved portion 2, intersections Pa between the reference plane W and the main bent portions 3A, and intersections Pb between the reference plane W and the sub-bent portions 3B are specified (refer to FIGS. 7 and 8). Then, virtual straight lines Sb connecting the intersections Pa to the intersections Pb and virtual straight lines Sa interconnecting the adjacent intersections Pa are specified, and as a result, the straight lines Sa and Sb continuing in a bending manner are formed in the reference plane W. While the lengths of straight lines Sa are substantially uniform and each of the straight lines Sb is longer than each of the straight lines Sa, the continuous straight lines Sa and Sb serve as at least a part of a polygon.

Subsequently, focusing on the intersections (reference intersections) Pa between the reference plane W and the main bent portions 3A and on the straight lines Sa, the straight lines Sa continuing in a bending manner serve as a part of a regular polygon Rp having the intersections Pa as apices and the curvature center Px as the center. Specifically, assuming two straight lines connecting an adjacent pair of the intersections Pa to the curvature center Px, the two straight lines intersect at the curvature center Px. An included angle α of the two straight lines serves as a central angle of the regular polygon Rp. In the case of the present embodiment, the included angle α is 30 degrees, so that the number of corners of the regular polygon Rp is 12, which results in a regular dodecagon. The fact that the straight lines Sa serve as a part of the regular polygon Rp means that the main bent portions 3A are formed at even intervals. Consequently, a good appearance is obtained at the finished stage, and the design is improved.

In the present embodiment, each of the virtual straight lines Sb interconnecting the intersections Pb and the intersections Pa are longer than each of the virtual straight lines Sa interconnecting the adjacent intersections Pa, and in addition, a part of each of the virtual straight lines Sb overlaps a part of the regular polygon. Rp. The distance from the curvature center Px to each of the intersections Pb is larger than the distance from the curvature center Px to each of the intersections Pa. Therefore, if a circle having a radius of the distance from the curvature center Px to each of the intersections Pb is drawn, the circle results in a large-diameter circle that is concentric to and has a larger radius than a circle passing through the apices of the regular polygon Rp.

The curvature center Px serving as the center of the regular polygon Rp refers to, for example, the rotational axis line Ar of the bending unit 50 that rotationally moves during the bending processing in the manufacturing method described above. Alternatively, the curvature center Px can be estimated, even though a certain amount of error is present, based on the pipe 1 after being manufactured. For example, if a circle passing through three or more of the intersections Pa is assumed in the reference plane W, the center of the circle serves as the curvature center Px, and the distance from the curvature center Px to the pipe axis line Ta serves as the radius of curvature (r).

Although the number of corners of the regular polygon Rp is 12 in the present embodiment, the number of corners is not limited to that of a dodecagon, but is preferably set to six or larger, that is, to equal to or larger than that of a hexagon so that the intervals between the main bent portions 3A are not narrowed, and wrinkle-like undulations and wrinkles can be prevented from occurring in a more reliable manner. The present embodiment exemplifies an aspect in which the number of the intersections Pa is five, that is, the number of the straight lines Sa is four. However, for example, even if the number of the straight lines Sa is one, the straight line Sa can be said to be a part of a regular polygon if distances between a pair of the intersections Pa at both ends of the straight line Sa and the curvature center Px are substantially equal to each other.

The number of corners of the regular polygon RP is preferably set to a natural number that is, for example, six or larger and equal to or smaller than a value (x) derived, by Expression (1) below so that the main bent portions 3A are formed in a more reliable manner. In Expression (1), (d) denotes the outside diameter of the straight portion 5 continuing to the curved portion 2, (r) denotes the radius of curvature of the curved portion 2, and (t) denotes the wall thickness of the straight portion 5.

[Math. 3]

$$x=180/\sin^{-1}(t/(2r-d)) \quad (1)$$

While the outside diameter of the straight portion 5 has been described to be denoted as (d) in Expression (1) above, the outside diameter (d) of the straight portion 5 is common to the outside diameter (d) of the straight unprocessed pipe 100 if the above-described manufacturing method of bending the unprocessed pipe 100 is taken into consideration.

A top side 4a of each of the main non-bending surfaces 4A (refer to FIG. 6) is a virtual straight line interconnecting the top ends of the adjacent main bent portions 3A on the circumferential surface 2a of the curved portion 2. A bottom side 4b of the main non-bending surface 4A is a virtual straight line interconnecting the bottom ends of the adjacent main bent portions 3A. A range (non-bending surface range) from the top side 4a to the bottom side 4b of the main non-bending surface 4A can be defined based on a relation among the top end and the bottom end of each of the main bent portions 3A and the curvature center Px. First, a straight line passing through the top end of the main bent portion 3A serving as a representative value of the top side 4a of the main non-bending surface 4A and the curvature center Px is assumed, and a straight line passing through the bottom end of the main bent portion 3A serving as a representative value of the bottom side 4b of the main non-bending surface 4A and the curvature center Px is assumed. These two straight lines intersect at the curvature center Px, and a crossing angle θ (refer to FIG. 6) therebetween is 90 degrees or smaller. That is, the non-bending surface range mentioned above refers to a range within the crossing angle θ (refer to FIG. 6) of 90 degrees or smaller as viewed from the curvature center Px.

Figure 8:
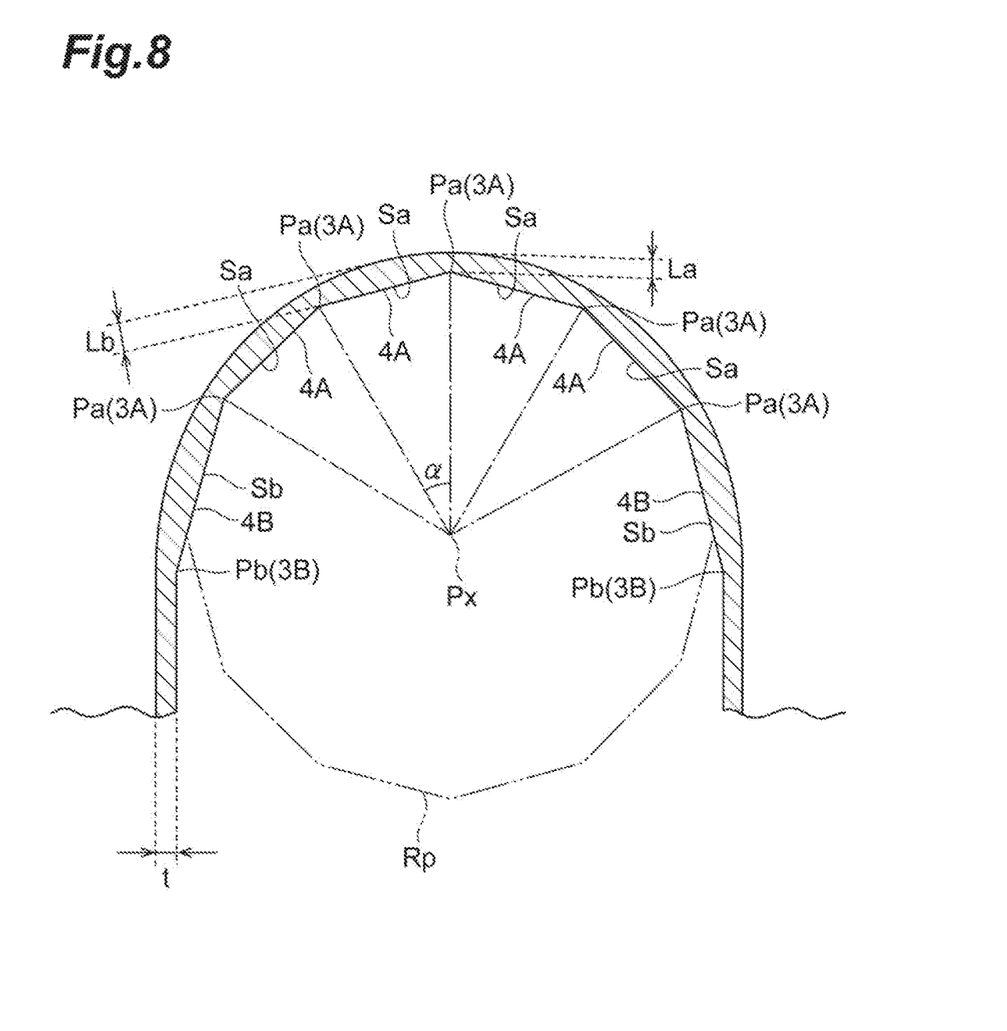
FIG. 8 illustrates a cross section of the curved portion of the pipe cut along the reference plane, and is a sectional view illustrating a circumferential surface on the inside on the curvature center side of curved portion of the pipe in an enlarging manner.

The portion where the main bent portion 3A is formed is a portion that bends in the bending processing, and consequently, a wall thickness La thereof is substantially reduced (refer to FIG. 8). In contrast, the wall is thickened at the main non-bending surface 4A serving as a portion other than the main bent portion 3A, and thus, a wall thickness Lb is substantially larger than the wall thickness La at the main bent portion 3A. This means that the surplus wall thickness generated at the circumferential surface 2a on the inside of the curved portion 2 is absorbed by the main non-bending surface 4A, and means that, as a result, wrinkles are effectively prevented from appearing on the main non-bending surface 4A. To supplement the meaning of the fact that the wall thickness Lb at the main non-bending surface 4A is larger than the wall thickness La at the main bent portion 3A, the fact means that the wall thickness Lb at least at a middle portion of the main non-bending surface 4A between the adjacent two main bent portions 3A is larger than the wall thickness La at the main bent portions 3A. The same applies to the portions where the sub-bent portions 3B are formed. The wall thickness at the sub non-bending surfaces 4B is substantially larger than the wall thickness at the sub-bent portions 3B.

To supplement the description of each of the main non-bending surfaces 4A and each of the sub non-bending surfaces 4B, the main non-bending surface 4A refers to the following: if a line of intersection between the main non-bending surface 4A and the reference plane W is specified, this line of intersection is a line on a straight line Sa interconnecting the adjacent intersections Pa or a line convex toward a side of the straight line Sa opposite to the pipe axis line Ta, but is not a curve concave toward the pipe axis line Ta from the straight line Sa. The sub non-bending surface 4B refers to the following: if a line of intersection between the sub non-bending surface 4B and the reference plane W is specified, this line of intersection is a line on a straight line Sb interconnecting an intersection. Pa and an intersection Pb or a line convex toward a side of the straight line Sb opposite to the pipe axis line Ta, but is not a curve concave toward the pipe axis line Ta from the straight line Sb.

The following describes working and effects of the pipe 1 according to the present embodiment in a summarized manner. The metal pipe 1 according to the present embodiment includes the curved portion 2 produced by bending, and the circumferential surface 2a on the inside, that is, the curvature center Px side of the curved portion 2 is provided with the main non-bending surfaces 4A, the sub non-bending surfaces 4B, and the main bent portions 3A and the sub-bent portions 3B at which the main non-bending surfaces 4A and the sub non-bending surfaces 4B are connected in a bending manner.

For example, in the case of a general pipe produced by bending, the inside, that is, the curvature center side thereof is compressed to easily generate the wrinkles. The pipe 1 according to the present embodiment is, however, bent so as to absorb the wrinkles with the main bent portions 3A and the sub-bent portions 3B, and consequently, not easily generates the wrinkles that impair the appearance. In addition, since the pipe 1 is bent at the main bent portions 3A and the sub-bent portions 3B, the main non-bending surfaces 4A and the sub non-bending surfaces 4B without the wrinkle-like undulations are formed between the main bent portions 3A and between the sub-bent portions 3B and the main bent portions 3A. As a result, stagnation and resistance of a flow of a fluid can be reduced on the inner surface side of the pipe where the fluid flows.

In the pipe 1 according t the present embodiment, the wall thickness Lb at the main non-bending surfaces 4A is larger than the wall thickness La at the main bent portions 3A. This is a result of the fact that the surplus wall thickness generated on the inside, that is, the curvature center Px side of the curved portion 2 is absorbed by the wall thickness Lb at the main non-bending surfaces 4A. Thus, the wrinkle-like undulations can be prevented from occurring in a more reliable manner. In the same manner, since the wall thickness at the sub non-bending surfaces 4B is larger than the wall thickness at the sub-bent portions 3B, the wrinkle-like undulations on the sub non-bending surfaces 4B can be prevented from occurring in a more reliable manner.

In the pipe 1 according to the present embodiment, the straight lines Sa interconnecting the intersections Pa in the reference plane W serve as a part of the regular polygon Rp having the intersections Pa as the apices and the curvature center Px as the center. As a result, the main bent portions 3A are formed at even intervals, and consequently, a good appearance is obtained at the finished stage, and the design is improved.

Moreover, if the number of corners of the regular polygon Rp is six or larger, the intervals between the main bent portions 3A are not narrowed, and the wrinkle-like undulations and the wrinkles can be prevented from occurring in a more reliable manner, which is preferable.

The pipe 1 is manufactured with the following manufacturing method. That is, in the present embodiment, the unprocessed pipe 100 is curved while being bent at the main apices 61 and the sub-apices 63 having the circular arc shape provided in the die unit 40. As a result, the main bent portions 3A corresponding to the main apices 61, the sub-bent portions 3B corresponding to the sub-apices 63, and the main non-bending surfaces 4A and the sub non-bending surfaces 4B connected in a bending manner at the main bent portions 3A and the sub-bent portions 3B are formed on the circumferential surface 2a on the inside, that is, the curvature center Px side of the curved portion 2.

With this manufacturing method, the wrinkles can be absorbed by the main bent portions 3A and the sub-bent portions 3B that are substantially intended to be formed, and in addition, the curved portion 2 without the wrinkle-like undulations can be formed. As a result, the pipe 1 can be manufactured that has a good appearance, and that can reduce the stagnation and the resistance of the flow on the inner surface side of the pipe where the fluid flows. With this manufacturing method, the pipe 1 without wrinkles can easily be formed without using a wiper. As a result, the pipe 1 having the curved portion 2 with a small radius of curvature can easily be manufactured.

Figure 9:
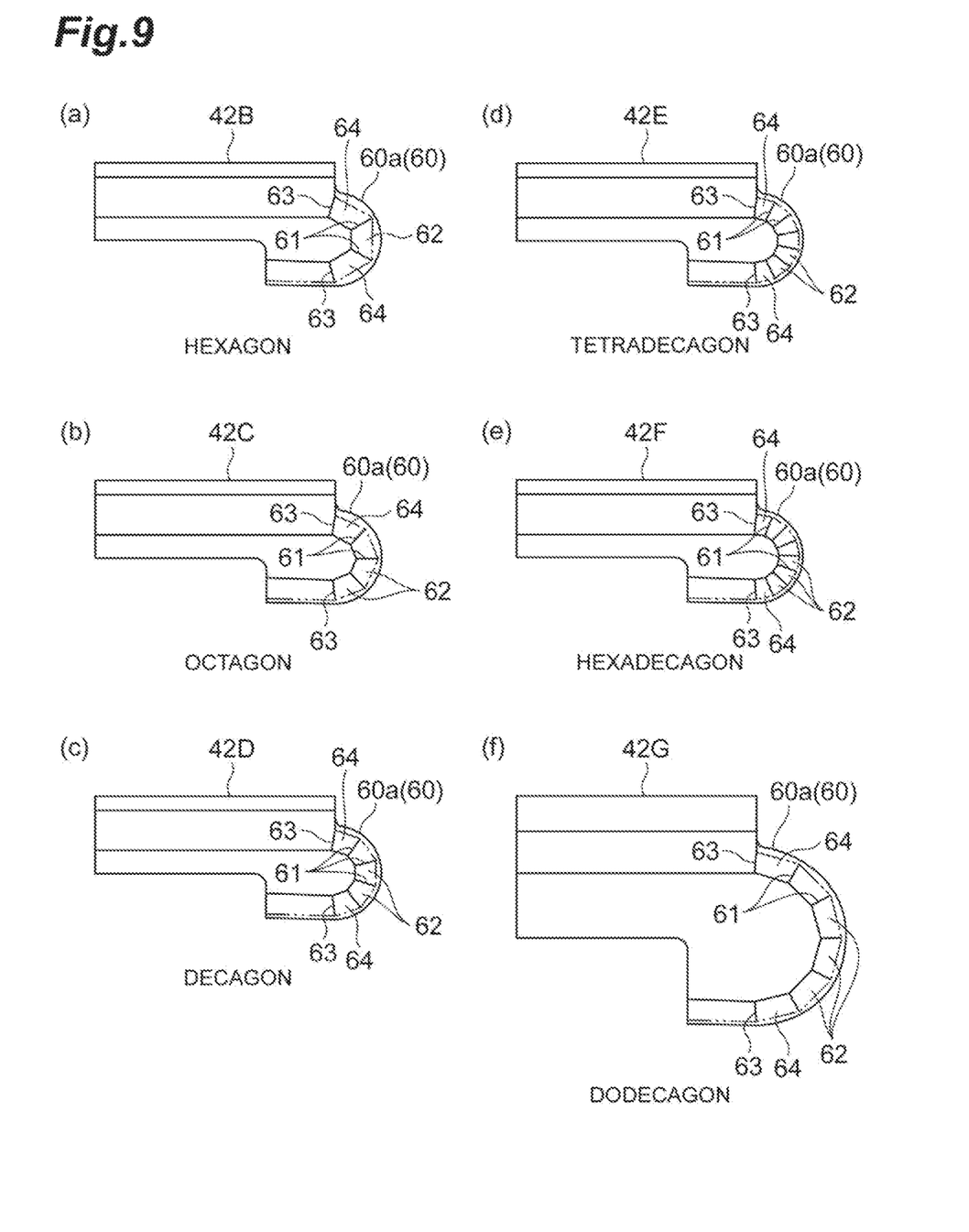
FIG. 9 illustrates plan views of modifications of the split roll lower die, that is.

The following describes modifications of the split roll lower die of the roll die 41 with reference to FIG. 9. In the following description, the same reference numerals will be assigned to the same elements or structures as those of the embodiment described above.

A split roll lower die 42B according to a first modification of the embodiment (refer to FIG. 9(a)) is used to manufacture the pipe 1 in which the arrangement of the main bent portions 3A in the curved portion 2 forms a part of a regular hexagon. The lower die groove 60a of the split roll lower die 42B is provided with two of the main apices 61, two of the sub-apices 63, two of the sub-receiving surfaces 64, and one of the main receiving surfaces 62. The split roll lower die 42B is used to manufacture the metal pipe 1 including two of the main bent portions 3A, two of the sub-bent portions 3B, one of the main non-bending surfaces 4A, and two of the sub non-bending surfaces 4B. In the case of the pipe 1 manufactured using the split roll lower die 42B, the radius of curvature (r) is equal to that of the pipe 1 manufactured using the split roll lower die 42A described above.

A split roll lower die 42C according to a second modification of the embodiment (refer to FIG. 9(b)) is used to manufacture the pipe 1 in which the arrangement of the main bent portions 3A in the curved portion 2 forms a part of a regular octagon. A split roll lower die 42D according to a third modification of the embodiment (refer to FIG. 9(c)) is used to manufacture the pipe 1 in which the arrangement of the main bent portions 3A in the curved portion 2 forms a part of a regular decagon. A split roll lower die 42E according to a fourth modification of the embodiment (refer to FIG. 9(d)) is used to manufacture the pipe 1 in which the arrangement of the main bent portions 3A in the curved portion 2 forms a part of a regular tetradecagon. A split roll lower die 42F according to a fifth modification of the embodiment (refer to FIG. 9(e)) is used to manufacture the pipe 1 in which the arrangement of the main bent portions 3A in the curved portion. 2 forms a part of a regular hexadecagon. In the case of the pipe 1 manufactured using any of the split roll lower dies 42B to 42F according to the second to fifth modifications described above, the radius of curvature (r) is equal to that of the pipe 1 manufactured using the split roll lower die 42A described above.

A split roll lower die 42G according to a sixth modification of the embodiment (refer to FIG. 9(f)) is used to manufacture the pipe 1 in which the arrangement of the main bent portions 3A in the curved portion 2 forms a part of a regular dodecagon. In the case of the pipe 1 manufactured using the split roll lower die 42G according to the sixth modification, the radius of curvature is twice the radius of curvature of the pipe 1 manufactured using the split roll lower die 42A described above.

Although the present invention has been described above by exemplifying the embodiment and the modifications thereof, the present invention is not limited to only the embodiment and the modifications thereof described above. For example, the intervals between the bent portions need not be even, and the intersections between the main bent portions and the reference plane need not be arranged in the regular polygonal form. In the embodiment above, an aspect has been described in which the straight portions continue to both ends of the curved portion. However, an aspect may be employed in which no straight portion is provided, or the straight portion is provided at only one end of the curved portion.

REFERENCE SIGNS LIST

1 Pipe, 2 Curved portion, 2a Inside circumferential surface, 3A Main bent portion (bent portion), 3B Sub-bent portion, 4A Main non-bending surface (non-bending surface), 4B Sub non-bending surface (non-bending surface), 5 Straight portion, 40 Die unit (die), 61 Main apex (apex), 62 Main receiving surface (non-bending surface receiving portion), 63 Sub-apex (apex), 64 Sub-receiving surface (non-bending surface receiving portion), 100 Unprocessed pipe, d Outside diameter of straight portion, r Radius of curvature, t Wall thickness of straight portion, Lb Wall thickness at non-bending surface, La Wall thickness at bent portion, Ta Pipe axis line, W Reference plane, Pa Intersection (reference intersection), Pb Intersection, Rp Regular polygon, Sa Straight line interconnecting intersections Pa, Sb Straight line interconnecting intersections Pa and Pb, Px curvature center.

The invention claimed is:

1. A metal pipe including a pipe axis line and a curved portion produced by bending, wherein
an outer circumferential surface of the curved portion comprises an inside portion closer to a center of a curvature of the curved portion than the pipe axis line,
a plurality of non-bending surfaces on the inside portion; and
a plurality of bent portions on the inside portion, at which the non-bending surfaces are connected in a bending manner, and wherein
the pipe axis line of the curved portion bends, and
a plane on the pipe axis line and the bent portions intersects each of the non-bending surfaces to form a line of intersection, and each line of intersection between the plane and each of the non-bending surfaces is interconnected to an adjacent line of intersection by a straight line,
wherein the bent portions include a pair of sub-bent portions provided at both ends thereof in a direction along the pipe axis line and a plurality of main bent portions provided between the pair of sub-bent portions, and
at the positions where the intersections between the plane and the main bent portions are defined, straight lines interconnecting the adjacent intersections serve as a part of a regular polygon having the intersections as apices thereof and having the center of the curvature side as a center thereof;
wherein a number of corners of the regular polygon is six or larger; and
further comprising a straight portion continuously connected to the curved portion, wherein the number of corners of the regular polygon is a natural number equal to or smaller than a value (x) derived by Expression (1) below, where (d) denotes an outside diameter of the straight portion, (r) denotes a radius of curvature of the curved portion, and (t) denotes a wall thickness of the straight portion:

$$x=180/\sin^{-1}(t/(2r-d)).$$ [Expression (1)]

2. The metal pipe according to claim 1, wherein a wall thickness at the non-bending surfaces is larger than a wall thickness at the bent portions.

3. The metal pipe according to claim 1, wherein, straight lines interconnecting the adjacent intersections serve as a part of a polygon in the plane.

4. A metal pipe including a pipe axis line, a curved portion produced by bending and a straight portion continuously connected to the curved portion, wherein
an outer circumferential surface of the curved portion comprises an inside portion closer to a center of a curvature of the curved portion than the pipe axis line,
a plurality of non-bending surfaces on the inside portion; and
a plurality of bent portions on the inside portion, at which the non-bending surfaces are connected in a bending manner, and wherein
the pipe axis line of the curved portion bends,
in a case where intersections between a virtual plane on the pipe axis line and the bent portions are defined, straight lines interconnecting the adjacent intersections serve as a part of a polygon in the plane,
the bent portions include a pair of sub-bent portions provided at both ends thereof in a direction along the pipe axis line and a plurality of main bent portions provided between the pair of sub-bent portions,
in a case where intersections between the plane and the main bent portions are defined, straight lines interconnecting the adjacent intersections serve as a part of a regular polygon having the intersections as apices thereof and having the center of the curvature side as a center thereof,
a number of corners of the regular polygon is six or larger, and
the number of corners of the regular polygon is a natural number equal to or smaller than a value (x) derived by Expression (1) below, where (d) denotes an outside diameter of the straight portion, (r) denotes a radius of curvature of the curved portion, and (t) denotes a wall thickness of the straight portion:

$$x = 180/\sin{-1}(t/(2r-d)). \qquad \text{[Expression (I)]}$$

\* \* \* \* \*